US009667930B2

(12) United States Patent
Inoue et al.

(10) Patent No.: US 9,667,930 B2
(45) Date of Patent: May 30, 2017

(54) PROJECTION APPARATUS, PROJECTION METHOD, AND PROJECTION PROGRAM MEDIUM WHICH CORRECTS IMAGE DISTORTION BASED ON PIXEL USAGE

(71) Applicant: CASIO COMPUTER CO., LTD., Shibuya-ku, Tokyo (JP)

(72) Inventors: Hideaki Inoue, Musashimurayama (JP); Ken Yoshino, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 98 days.

(21) Appl. No.: 14/222,121

(22) Filed: Mar. 21, 2014

(65) Prior Publication Data
US 2014/0285778 A1 Sep. 25, 2014

(30) Foreign Application Priority Data
Mar. 22, 2013 (JP) ................................. 2013-060759

(51) Int. Cl.
H04N 9/31 (2006.01)
(52) U.S. Cl.
CPC ......... *H04N 9/3185* (2013.01); *H04N 9/3188* (2013.01); *H04N 9/3191* (2013.01); *H04N 9/3194* (2013.01)
(58) Field of Classification Search
CPC .. H04N 9/3185; H04N 9/3188; H04N 9/3191; H04N 9/3194; G03B 21/147
See application file for complete search history.

(56) References Cited

U.S. PATENT DOCUMENTS

| 7,125,122 B2 * | 10/2006 | Li | H04N 5/74 348/E5.137 |
| 7,144,115 B2 * | 12/2006 | Li | G03B 21/26 348/E9.027 |
| 7,222,971 B2 | 5/2007 | Akutsu | |
| 7,252,387 B2 * | 8/2007 | Raskar | G03B 21/14 348/746 |

(Continued)

FOREIGN PATENT DOCUMENTS

| CN | 1678048 A | 10/2005 |
| CN | 1768527 A | 5/2006 |

(Continued)

OTHER PUBLICATIONS

Chinese Office Action (and English translation thereof) dated Jul. 21, 2015, issued in counterpart Chinese Application No. 201410105342.X.

(Continued)

*Primary Examiner* — Bao-Luan Le
(74) *Attorney, Agent, or Firm* — Holtz, Holtz & Volek PC

(57) ABSTRACT

A CPU of a projector determines whether or not a correction mode in which the aspect ratio of an input image is changed to correct distortion is set and, if the correction mode is set, determines distortion correction process parameters for changing the aspect ratio of the image to be projected onto a screen to project the image in the form of a rectangular image, and the image converter performs geometric correction on the input image on the basis of the distortion correction process parameters to project the image subjected to distortion correction.

15 Claims, 15 Drawing Sheets

(56) References Cited

U.S. PATENT DOCUMENTS

| | | | | |
|---|---|---|---|---|
| 7,303,285 | B2* | 12/2007 | Inoue | H04N 9/317 353/70 |
| 7,352,913 | B2* | 4/2008 | Karuta | G02B 27/0025 348/746 |
| 7,537,350 | B2* | 5/2009 | Kobayashi | H04N 9/3185 353/121 |
| 7,887,195 | B2* | 2/2011 | Odagiri | H04N 9/3185 353/69 |
| 7,909,470 | B2 | 3/2011 | Yonezawa | |
| 8,162,487 | B2 | 4/2012 | Ofune et al. | |
| 8,300,978 | B2* | 10/2012 | Tamura | G09G 5/393 348/744 |
| 8,573,780 | B2* | 11/2013 | Ishii | H04N 9/3185 348/745 |
| 8,670,038 | B2* | 3/2014 | Furui | H04N 9/3194 348/135 |
| 2003/0043303 | A1* | 3/2003 | Karuta | G02B 27/0025 348/744 |
| 2005/0024598 | A1* | 2/2005 | Inoue | H04N 9/317 353/69 |
| 2005/0168705 | A1* | 8/2005 | Li | H04N 5/74 353/69 |
| 2005/0214662 | A1* | 9/2005 | Kobayashi | H04N 9/3185 430/22 |
| 2005/0231691 | A1* | 10/2005 | Li | G03B 21/26 353/69 |
| 2006/0209268 | A1* | 9/2006 | Raskar | G03B 21/14 353/69 |
| 2009/0238490 | A1* | 9/2009 | Tamura | G09G 5/393 382/275 |
| 2011/0157232 | A1* | 6/2011 | Ishii | H04N 9/3185 345/660 |
| 2012/0182416 | A1* | 7/2012 | Kawaguchi | H04N 9/3185 348/128 |
| 2013/0088689 | A1* | 4/2013 | Lin | G03B 21/204 353/31 |

FOREIGN PATENT DOCUMENTS

| | | |
|---|---|---|
| CN | 101577801 A | 11/2009 |
| JP | 2001-339671 A | 12/2001 |
| JP | 2002-247614 A | 8/2002 |
| JP | 2004032484 A | 1/2004 |
| JP | 2005123669 A | 5/2005 |
| JP | 2007214701 A | 8/2007 |
| JP | 2009-273015 A | 11/2009 |
| JP | 2013005140 A | 1/2013 |

OTHER PUBLICATIONS

Japanese Office Action (and English translation thereof) dated Dec. 6, 2016 issued in Japanese counterpart Application No. 2013-060759.

* cited by examiner

FIG. 3

100 DISTORTION CORRECTION MODE SETTING MENU SCREEN

PROJECTOR-AND-SCREEN RELATIVE ANGLE OBTAINMENT SETTING
☑ AUTOMATIC OBTAINMENT
   HORIZONTAL RELATIVE ANGLE h [+15°]
   VERTICAL RELATIVE ANGLE v [-15°]

CUTTING-OUT CONDITION SETTING
● MAXIMUM PIXEL USAGE   ○ MAXIMUM PROJECTION SIZE
○ FIXED DIAGONAL INTERSECTION

ROLL SETTING
● NOT CHANGING ROLL ANGLE   ○ PERMITTING CHANGE IN ROLL ANGLE
                               TILT BY [+4.0°]

DISTORTION CORRECTION MODE SETTING
○ NORMAL CORRECTION MODE
● ASPECT RATIO CHANGING CORRECTION MODE
   IN MAXIMUM PIXEL USAGE MODE
   ☑ CONDITION 1: PERMIT ASPECT RATIO CHANGING CORRECTION WHEN
       PIXEL USAGE IS [80] % OR LOWER
   ☐ CONDITION 2: PERMIT ASPECT RATIO CHANGING CORRECTION WHEN
       CHANGE IN ASPECT RATIO IS [20] % OR SMALLER

EFFECT OF CHANGE    BEFORE    AFTER    CHANGE
IN ASPECT RATIO
   PIXEL USAGE     [79.1%]   [84.9%]   [7.3%] up
   ASPECT RATIO    [1.78]    [1.96]    [+10.1%]

| h | -30 | -25 | -20 | -15 | -10 | -5 | 0 | +5 | +10 | +15 | +20 | +25 | +30 |
|---|---|---|---|---|---|---|---|---|---|---|---|---|---|
| +30 | | | | | | | 0 | | | | | | |
| +25 | | | | | | | 0 | | | | | | |
| +20 | | | -α | | | | 0 | | | | | | |
| +15 | | | | | | | 0 | | | | | | |
| +10 | | | | | | | 0 | | | | | | |
| +5 | | | | | | | 0 | | | | | | |
| 0 | 0 | 0 | 0 | 0 | 0 | 0 | 0 | 0 | 0 | 0 | 0 | 0 | 0 |
| -5 | | | | | | | 0 | | | | | | |
| -10 | | | | | | | 0 | | | | | | |
| -15 | | | | | | | 0 | | | | | | |
| -20 | | | | | | | 0 | | | | | | |
| -25 | | | | | | | 0 | | | | | | |
| -30 | | | | | | | 0 | | | | | | |

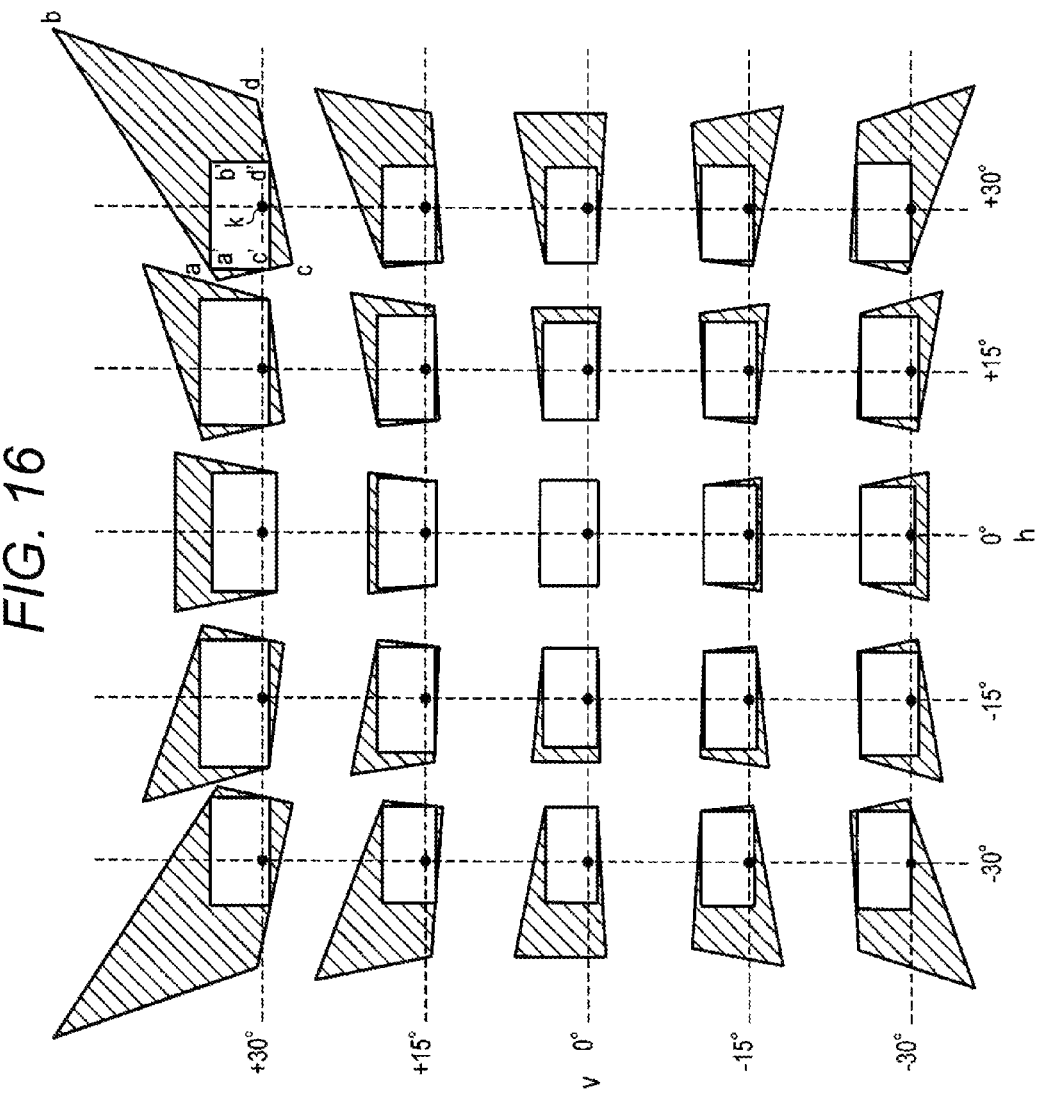

PROJECTION APPARATUS, PROJECTION METHOD, AND PROJECTION PROGRAM MEDIUM WHICH CORRECTS IMAGE DISTORTION BASED ON PIXEL USAGE

BACKGROUND

1. Technical Field

The present invention relates to a projection apparatus, a projection method, and a projection program medium.

2. Related Art

There is generally known a projector that is an image projection apparatus that projects an image based on image data output from an image output device such as a personal computer (PC) onto a projection target such as a screen.

When the optical axis of projection light of the projector is perpendicular to the projection plane of the projection target such as a screen, no distortion is caused in the projected image. If the optical axis is not perpendicular to the projection plane, however, owing to the installation angle of the projector, distortion is caused in the image.

Thus, as disclosed in JP 2001-339671 A, for example, a correction function typically called a trapezoid correction function for correcting distortion in an image is embedded in projectors. The distortion correction function is to correct distortion of a projected image on the basis of the angle (vertical angle) in the direction perpendicular to the horizontal plane of the optical axis and the angle (horizontal angle) in the horizontal direction that are obtained by a predetermined technique.

The principle of the distortion correction will be described with reference to FIG. 14. Herein, v and h are used as parameters of the angles. The angle v is an angle of a projector 1 in the direction perpendicular to the horizontal plane, and the angle h is an angle (direction) of the projector 1 in the horizontal direction. Note that a projection target (screen 2) is perpendicular to the horizontal plane. A horizontal base 3 is a base parallel to the horizontal plane. The x axis, y axis, and z axis express a projector coordinate system, in which the z axis is coincident with the optical axis of a projector optical system.

FIGS. 15A to 15C are detail views illustrating the relations between the projector coordinate system and the two angles h and v in FIG. 14 in this case.

Three solid arrows in FIG. 15A represent the projector coordinate system.

First, the projector 1 is rotated horizontally about the y axis as the rotation axis by the angle h that is a first angle in the direction of the arrows. As a result, the z axis and the x axis move to axes represented by dashed arrows.

Three solid arrows in FIG. 15B represent the projector coordinate system resulting from rotating the projector 1 by the angle h in the horizontal direction.

Next, the projector 1 is rotated about the x axis as the rotation axis by the angle v that is a second angle in the direction of the arrows. As a result, the z axis and the y axis move to axes represented by dashed arrows.

Three arrows in FIG. 15C represent the projector coordinate system resulting from rotating the projector 1 first by the angle h in the horizontal direction and then by the angle v in the vertical direction. In this case, the x axis is parallel to the horizontal base 3.

As described above, the z-axis direction, that is, the optical axis direction (projecting direction) of the projector optical system can be arbitrarily changed by using the angles h and v.

When the projector 1 is placed as illustrated in FIG. 14, a projected image that is supposed to be displayed originally in a rectangular shape is displayed in a distorted quadrangular shape as represented by an uncorrected distorted quadrangle abcd on the screen 2.

Note that FIG. 14 illustrates a state in which the z axis of the projector 1 is first turned horizontally rightward by the angle h=30° and then turned vertically upward by the angle v=30°.

The distortion correction is a technique of setting a corrected rectangle a'b'c'd' represented by a white rectangle inside of an uncorrected distorted quadrangle abcd and performing projective transformation on input image information into the corrected rectangle a'b'c'd'.

FIG. 16 is a diagram illustrating relations between the uncorrected distorted quadrangle and the corrected rectangle before and after such distortion correction of the projector 1 as viewed on the projection plane; and FIG. 17 is a diagram illustrating such relations as viewed on the surface of an output display device (such as a micromirror display device or a liquid crystal device).

In FIG. 16, a white rectangle represents the corrected rectangle a'b'c'd', which is an image effective part. A hatched part represents an image ineffective part remaining after cutting out the corrected rectangle a'b'c'd' from the uncorrected distorted quadrangle abcd. A point k represents a position through which the optical axis of the projector optical system passes on the projection plane.

A hatched part and a white quadrangle in FIG. 17 correspond to the hatched part and the white rectangle in FIG. 16, respectively. A percentage in a white quadrangle represents the pixel usage of the output display device. The quadrangle at the center where h=v=0 represents a case in which no distortion correction is performed and the pixel usage in this case is 100%.

There are multiple cutting-out methods in distortion correction, and FIGS. 16 and 17 illustrate an example employing a cutting-out method with which the pixel usage is improved while the aspect ratio of the image is remained.

The specification of the projector includes the aspect ratio of the output display device being 16:9 (approximately 1.78), the throw ratio being approximately 0.92, and the position of the optical axis of the output display device being approximately 20% higher than the height of the output display device from the center of the lower side. Note that the throw ratio is expressed by (throw ratio)=(width of projected image)÷(projection distance), and that the condition of the throw ratio is when no distortion correction is conducted.

Note that the projector 1 is configured to select and use an output display device depending on the aspect ratio of an image input from an image output device such as a PC so as to project the image at multiple aspect ratios. In this case, the distortion correction maintains the aspect ratio of the original image, that is, the aspect ratio when no distortion correction is performed even if the aspect ratio of the image input to the projector 1 is switched.

The distortion correction is therefore not very flexible.

SUMMARY

It is therefore an object of the present invention to provide a projection apparatus, a projection method, and a projection program medium capable of increasing the flexibility in distortion correction.

To achieve the aforementioned and other objects, an aspect of the present invention provides a projection apparatus to which an image is input for projection onto a projection target, the projection apparatus including: a distortion correction unit configured to correct an image to be projected onto the projection target to be a rectangular image, wherein the distortion correction unit has a correction mode in which an aspect ratio of the input image is changed to correct distortion.

To achieve the aforementioned and other objects, another aspect of the present invention provides a projection method for a projection apparatus to which an image is input for projection onto a projection target, the projection method including: determining whether or not a correction mode in which an aspect ratio of the input image is changed to correct distortion is set; and correcting distortion to correct an image to be projected onto the projection target to be a rectangular image by changing the aspect ratio of the image when the correction mode in which the aspect ratio is changed to correct distortion is set.

To achieve the aforementioned and other objects, another aspect of the present invention provides a non-transitory computer readable recording medium having a program causing a computer in a projection apparatus that projects an image onto a projection target to execute: determining whether or not a correction mode in which an aspect ratio of the input image is changed to correct distortion is set; and correcting an image to be projected onto the projection target to be a rectangular image by changing the aspect ratio of the image when the correction mode in which the aspect ratio is changed to correct distortion is set.

BRIEF DESCRIPTION OF THE DRAWINGS

FIG. 3 is a diagram illustrating a distortion correction mode setting menu screen according to the first embodiment;

FIG. 16 is a diagram illustrating relations between an uncorrected distorted quadrangle and a corrected rectangle before and after distortion correction of the projector as viewed on the projection plane.

DETAILED DESCRIPTION

First Embodiment

A first embodiment will be described with reference to the drawings.

A projection apparatus according to the present embodiment employs digital light processing (DLP) (registered trademark) using a micromirror display device as an output display device.

Figure 1:
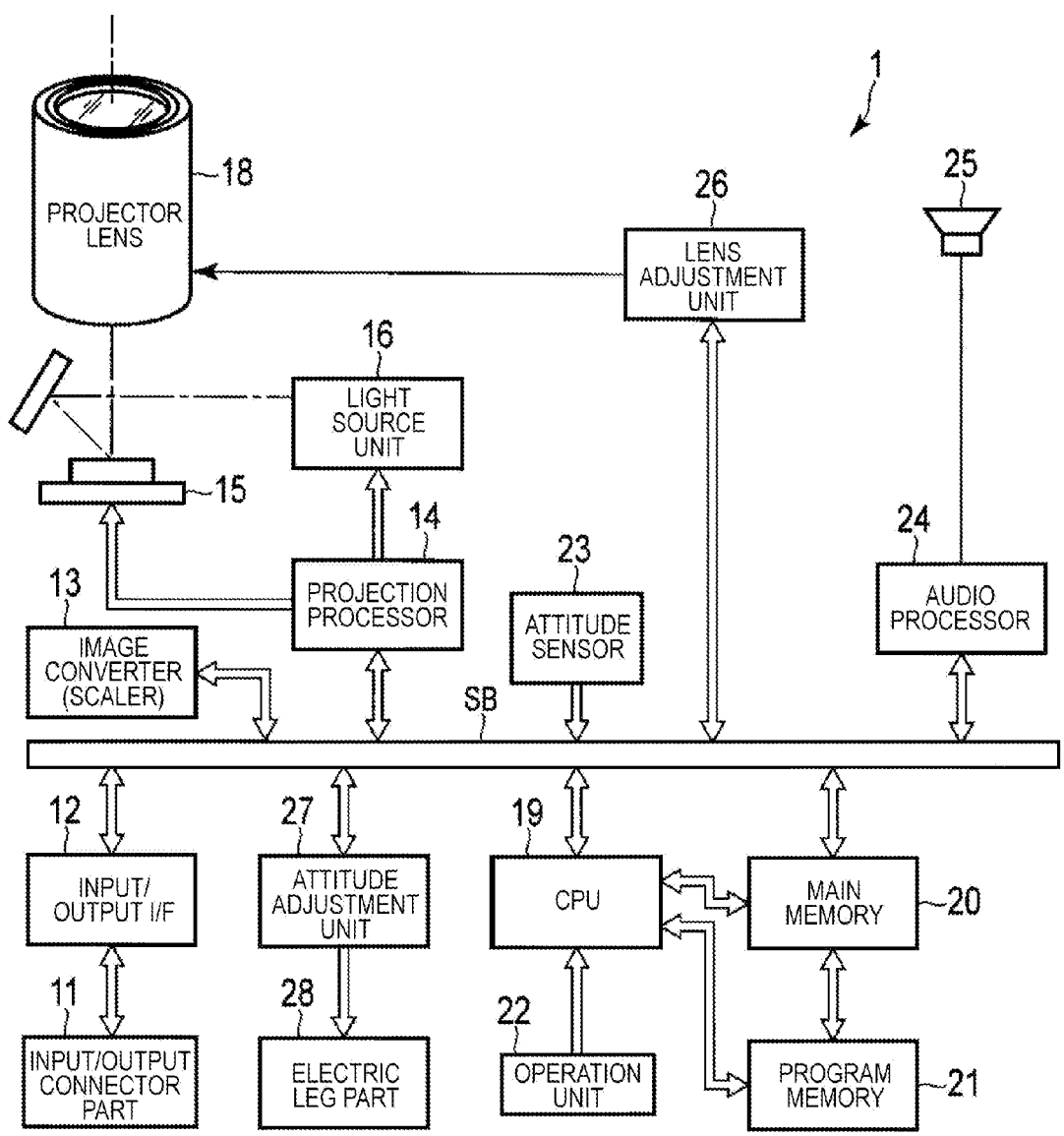
FIG. 1 is a block diagram illustrating an exemplary configuration of a projector according to a first embodiment of the present invention.

FIG. 1 illustrates an outline of a configuration of a projector 1 that is a projection apparatus according to the present embodiment. The projector 1 includes an input/output connector part 11, an input/output interface (I/F) 12, an image converter 13, a projection processor 14, a micromirror device 15, a light source unit 16, a mirror 17, a projector lens 18, a CPU 19, a main memory 20, a program memory 21, an operation unit 22, an attitude sensor 23, an audio processor 24, a speaker 25, a lens adjustment unit 26, an attitude adjustment unit 27, an electric leg part 28, and a system bus SB.

The input/output connector part 11 is provided with terminals such as a pin-jack (RCA) video input terminal and a D-sub 15 RGB input terminal, and receives analog image signals as input. The input image signals are input to the image converter 13 via the input/output interface 12 and the system bus SB. Input analog image signals of various standards are converted into digital image signals.

The input/output connector part 11 may also be provided with an HDMI (registered trademark) terminal or the like and receive digital image signals as input in addition to analog image signals.

The input/output connector part 11 also receives audio signals that are analog or digital signals as input. The input audio signals are input to the audio processor 24 via the input/output interface 12 and the system bus SB.

Furthermore, the input/output connector part 11 is also provided with an RS-232C terminal and a USB terminal, for example.

The image converter 13 is also referred to as a scaler.

The image converter 13 converts input image data to adjust the resolution and the gradation thereof and generate image data in a predetermined format suitable for projection.

The image converter 13 sends the converted image data to the projection processor 14. Where necessary, the image converter 13 sends image data obtained by superimposing a symbol indicating any of various operation states for on-screen display (OSD) as processed image data to the projection processor 14.

Where necessary, the image converter 13 also performs a distortion correction process of performing geometric transformation on a projection image to project the image on a projection target such as a screen in an appropriate shape depending on the projection state.

The light source unit 16 emits light rays of multiple colors including primary colors of red (R), green (G), and blue (B). Here, the light source unit 16 is configured to emit light rays of multiple colors sequentially on a time division basis. Light emitted by the light source unit 16 is totally reflected by the mirror 17 and incident on the micromirror device 15.

The micromirror device 15 includes multiple micromirrors arranged in an array. The micromirrors are rapidly switched on and off to reflect light emitted by the light source unit 16 toward the projector lens 18 and away from the projector lens 18. The micromirror device 15 has an array of micromirrors corresponding to 1600 horizontal pixels 900 vertical pixels called HD+ or WXGA++, for example. The micromirror device 15 forms an image with HD+ resolution, for example, by reflection at the micromirrors. The micromirror device 15 thus functions as a spatial light modulation device.

The projection processor 14 drives the micromirror device 15 to display an image representing the image data according to the image data sent from the image converter 13. Thus, the projection processor 14 switches the micromirrors of the micromirror device 15 on and off. Note that the projection processor 14 rapidly drives the micromirror device 15 on a time division basis. The number of divisions per unit time is a number obtained by multiplying a frame rate according to a predetermined format, such as 60 [frames/second], the number of divisions for color components, and the number of gradations for display.

The projection processor 14 also controls operation of the light source unit 16 to synchronize with the operation of the micromirror device 15. Specifically, the projection processor 14 controls the operation of the light source unit 16 to divide frames into time slots (segments) and sequentially emit light of every color component for each frame.

The projector lens 18 adjusts light guided by the micromirror device 15 to light for projection onto a projection target such as a screen 2, for example. Thus, an optical image formed by light reflected by the micromirror device 15 is projected and displayed onto the projection target such as the screen 2 via the projector lens 18.

The projector lens 18 has a zoom mechanism and thus has a function of changing the size of an image to be projected.

The projector lens 18 also has a focus adjustment mechanism to adjust the focused state of a projected image.

The projection processor 14, the micromirror device 15, the light source unit 16, the projector lens 18, and the like thus function as a projection unit configured to project an image.

The audio processor 24 includes an audio source circuit such as a PCM audio source. The audio processor 24 drives the speaker 25 to emit amplified sound on the basis of analog audio data input from the input/output connector part 11 or on the basis of a signal obtained by converting digital audio data provided at the projecting operation into analog data.

The audio processor 24 also generates a beep sound or the like where necessary.

The speaker 25 is a typical speaker that emits audio on the basis of a signal input from the audio processor 24.

The CPU 19 controls operation of the image converter 13, the projection processor 14, and the audio processor 24, the lens adjustment unit 26, and the attitude adjustment unit 27.

The CPU 19 is connected to the main memory 20 and the program memory 21. The main memory 20 is an SRAM, for example. The main memory 20 functions as a working memory for the CPU 19. The program memory 21 is an electrically rewritable nonvolatile memory. The program memory 21 stores operation programs to be executed by the CPU 19 and various format data, or the like.

The CPU 19 is also connected to the operation unit 22. The operation unit 22 includes a key operation unit provided on the body of the projector 1 and an infrared ray receiving unit configured to receive infrared light from a remote controller (not illustrated) exclusively for the projector 1. The operation unit 22 outputs to the CPU 19 a key operation signal based on a key operation of the user at the key operation unit of the body or the remote controller.

The CPU 19 controls the operation of the respective components of the projector 1 in response to user's instruction from the operation unit 22 by using the programs and data stored in the main memory 20 and the program memory 21.

The attitude sensor 23 has a triaxial acceleration sensor and an orientation sensor that detects orientation, for example. The acceleration sensor detects the attitude angle of the projector 1 to the direction of gravity, that is, the pitch and roll angles thereof. The yaw angle thereof is detected as a relative bearing with respect to a reference orientation detected by the orientation sensor. The attitude sensor 23 outputs the detection result to the CPU 19.

The lens adjustment unit 26 drives the zoom mechanism of the projector lens 18 according to the control from the CPU 19 in response to a zoom changing instruction made by user's operation at the operation unit 22. As a result of driving the zoom mechanism by the lens adjustment unit 26, the size of the projected image changes.

The lens adjustment unit 26 also drives a focusing lens of the projector lens 18 according to an instruction from the CPU 19.

The electric leg part 28 functions as an attitude adjustment mechanism to change the attitude of the projector 1. Specifically, the electric leg part 28 can adjust the levelness of the projector 1 by changing the length of each leg.

The attitude adjustment unit 27 drives the electric leg part 28 according to an instruction from the CPU 19.

Operation of the projector 1 according to the present embodiment will be described below. First, projecting operation of the projector 1 will be described.

The projecting operation is executed by the projection processor 14 under the control of the CPU 19.

Operation of the light source unit 16 is controlled by the projection processor 14. The projection processor 14 sequentially emits light rays of three colors, which are red light (R), green light (G), and blue light (B), from the light source unit 16, for example, by switching on/off of semiconductor lasers or LEDs in the light source unit 16 that emit light rays of the respective colors, and changing combination of the light sources and phosphors, or the like. The projection processor 14 make the red light, green light, and blue light sequentially enter the micromirror device 15 from the light source unit 16.

The micromirror device 15 is driven to guide incident light of each color for each micromirror (for each pixel) to the projector lens 18 for a longer time as the gradation based on image data is higher and for a shorter time as the gradation based on image data is lower. In other words, the projection processor 14 controls the micromirror device 15 so that a micromirror corresponding to a pixel with high gradation to be ON for a long time and that a micromirror corresponding to a pixel with low gradation to be OFF for a long time. In this manner, the gradation of each color of light emitted through the projector lens 18 can be expressed by each mirror (pixel).

The gradations expressed by the times during which micromirrors are ON of the respective colors are combined for each frame to express a color image.

As described above, projection light expressing an image is emitted through the projector lens 18. The color image is displayed on the screen 2 or the like by projecting the projection light onto the screen 2.

Although an example of a projector using three colors of red light, green light, and blue light is presented in the above description, a projector may be configured to emit light of complementary colors such as magenta and yellow, or white light, and combine rays of these colors to form an image.

Next, a distortion correction process according to the present embodiment will be described. The distortion correction process is conducted by performing geometric transformation on input image information to project an image in an undistorted rectangle shape having as large a size as possible, for example, onto a projection target such as the screen 2. Thus, parameters for distortion correction process are determined when the projector 1 is installed, and the distortion correction process based on the distortion correction process parameters is conducted when an image is actually projected, for example.

Figure 2:
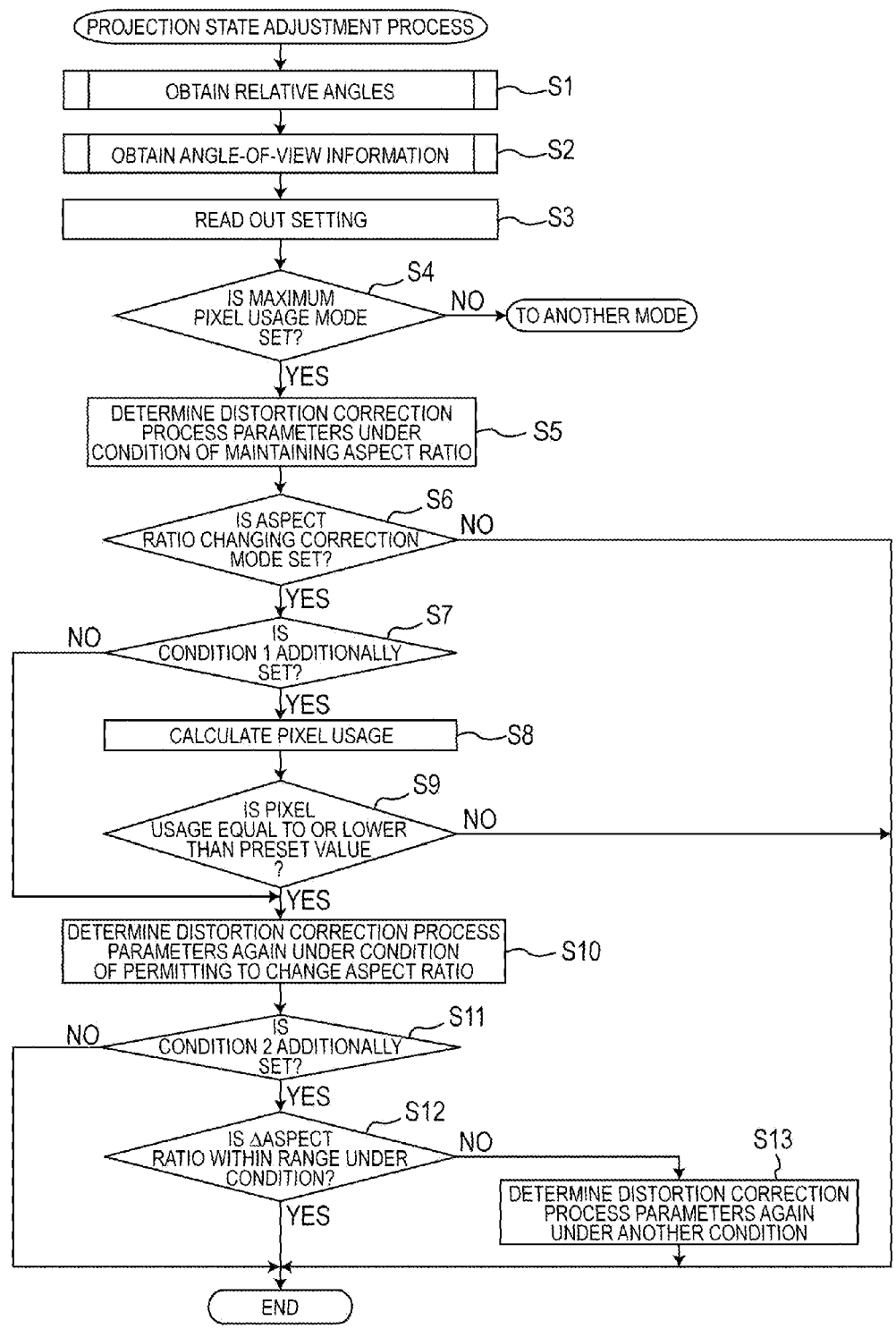
FIG. 2 is a flowchart illustrating an example of a projection state adjustment process of the projector according to the first embodiment.

FIG. 2 is a flowchart illustrating an example of a projection state adjustment process according to the present embodiment.

The projector 1 stores a program corresponding to this flowchart as part of projection programs to be executed by the CPU 19 in the program memory 21.

In step S1, the CPU 19 obtains relative angles between the projector 1 and the screen 2. Specifically, for installing the projector 1 on the horizontal base or the like, a user normally places the projector 1 in parallel with the screen 2, turns the projector 1 on, and changes and corrects the attitude of the projector 1 so that light emitted through the projector lens 18 is projected onto the screen 2. The CPU 19 can obtain the relative angles between the projector 1 and the screen 2 by detecting the motion of the projector 1 during the operation for changing the attitude of the projector 1 by the attitude sensor 23.

Subsequently, the process proceeds to step S2. In step S2, the CPU 19 obtains angle-of-view information (projector specification). Examples of the angle-of-view information include the throw ratio, the zoom value, and the lens shift amount. The CPU 19 can obtain the angle-of-view information by measurement using a sensor that is not illustrated, by reading out a value stored as a preset value for the projector in the program memory 21 or a value changed by the user operation and stored in the main memory 20 or the program memory 21, or the like.

After the CPU 19 has obtained the relative angles between the projector 1 and the screen 2 and the angle-of-view information in this manner, the process proceeds to step S3.

In step S3, the CPU 19 reads out a distortion correction mode setting stored in the main memory 20 or the program memory 21.

Note that this is set in advance by user operation on a distortion correction mode setting menu screen 100 as illustrated in FIG. 3, for example. Specifically, each of configuration items can be set by controlling the projection processor 14 by the CPU 19 to project and display the distortion correction mode setting menu screen 100 on the screen 2 when the projector 1 is turned on or when the menu is called and by operating the operation unit 22 by the user. Examples of the configuration items include a "projector-and-screen relative angle obtainment setting", a "cutting-out condition setting", and a "distortion correction mode setting".

The item of "projector-and-screen relative angle obtainment setting" is an item for setting whether or not to automatically obtain the relative angles between the projector 1 and the screen 2.

In this case, since the CPU 19 can obtain the angle h in the horizontal direction and the angle v in the vertical direction as described regarding step S1, the obtained relative angles can be displayed when the automatic obtainment is set. If the automatic obtainment is not set, the user can input a measurement value obtained by measurement with a protractor or the like through the operation unit 22. Needless to say, even when the automatic obtainment is set, the automatically obtained relative angles may be changed and input by the user through the operation unit 22.

The item of "cutting-out condition setting" is an item for setting a method for cutting out a corrected rectangle a'b'c'd' from an uncorrected distorted quadrangle abcd. This item allows selection from a "maximum pixel usage" mode, a "maximum projection size" mode, and a "fixed diagonal intersection" mode, and the like.

The "maximum pixel usage" mode is a mode in which a corrected rectangle a'b'c'd' is cut out from an uncorrected distorted quadrangle abcd in a manner that the corrected rectangle a'b'c'd' is shifted toward a higher pixel density side on the projection plane with regard to the pixel density.

Conversely, the "maximum projection size" mode is a mode in which a corrected rectangle a'b'c'd' is cut out in a manner that the corrected rectangle a'b'c'd' is shifted toward a lower pixel density side.

The "fixed diagonal intersection" mode is a mode in which a corrected rectangle a'b'c'd' is cut out in a manner that the intersection of the diagonals of the uncorrected distorted quadrangle and the intersection of the diagonals of the corrected rectangle a'b'c'd' are coincident (fixed).

The item of "distortion correction mode setting" is an item for setting either of a "normal correction mode" and an "aspect ratio changing correction mode".

The "normal correction mode" is a normal mode in which the aspect ratio of an original image input from an image output device is maintained.

In contrast, the "aspect ratio changing correction mode" is a novel mode according to the present embodiment in which a change in the aspect ratio of an original image is permitted.

When the "maximum pixel usage" mode is set as the cutting-out method, either of a "condition 1" and a "condition 2" can additionally be selected as a condition for permitting distortion correction that changes the aspect ratio.

The "condition 1" is to set the maximum percentage of the pixel usage at which the distortion correction that changes the aspect ratio is permitted, and the "condition 2" is to set the highest percentage of the change in the aspect ratio at which the distortion correction that changes the aspect ratio is permitted. The percentages can be set to arbitrary values by the user through the operation unit 22.

If the "condition 1" is not met, the aspect ratio is maintained. If the change in the aspect ratio is permitted, the aspect ratio is changed within the range under the "condition 2".

Note that up-pointing triangles and down-pointing triangles between numerical values and the percentages (%) of the conditions represent up/down keys. The percentages can be changed by operation of up/down keys provided on the operation unit 22.

The distortion correction mode setting menu screen 100 also includes an area for numerically displaying the values of the pixel usage and the aspect ratios before and after being changed and the amounts of changes thereof so as to inform the user of the effect of changing the aspect ratio by operation as will be described below. As a result, the user can project the distortion correction mode setting menu screen 100 again to check the effect after finishing the projection state adjustment process and before starting actual image projection, and then reset the distortion correction mode where necessary to perform the projection state adjustment process again, for example.

Referring back to FIG. 2, the description of the projection state adjustment process is continued.

After the distortion correction mode setting is read out in step S3, the process proceeds to step S4. In step S4, the CPU 19 determines whether or not the "maximum pixel usage" mode is set as the read distortion correction mode.

If the "maximum pixel usage" mode is set, the process proceeds to step S5. In step S5, the CPU 19 determines (recognizes) the shape of the uncorrected distorted quadrangle abcd on the basis of the obtained relative angles and angle-of-view information, and determines distortion correction process parameters for geometric correction so that the projected image is a rectangular image on the screen 2 by a cutting-out method that maximizes the pixel usage while maintaining the aspect ratio.

The cutting-out method that maximizes the pixel usage is cutting out the corrected rectangle a'b'c'd' in a manner that at least one point (any of the vertex a', the vertex c', and the side a'c') of the side a'c' of the corrected rectangle a'b'c'd' is in contact with the side on the higher pixel density side of the uncorrected distorted quadrangle abcd, that is, the side ac, for example, and that the corrected rectangle a'b'c'd' is inscribed in the uncorrected quadrangle abcd.

Note that the pixel usage need not necessarily be maximized in the "maximum pixel usage" mode but, needless to say, a cutting-out method that "improves" the pixel usage may be employed.

Subsequently, the process proceeds to step S6. In step S6, the CPU 19 determines whether or not the "aspect ratio changing correction mode" is set as the read distortion correction mode.

If the "aspect ratio changing correction mode" is not set, the CPU 19 terminates the projection state adjustment process. Subsequently, the image converter 13 will perform geometric correction on the basis of the distortion correction process parameters determined in step S5 on input image data to project an image subjected to distortion correction.

If, on the other hand, the "aspect ratio changing correction mode" is determined to be set in step S6, the process proceeds to step S7. In step S7, the CPU 19 determines whether or not the "condition 1" is additionally set as the read distortion correction mode.

If the "condition 1" is determined to be set, the process proceeds to step S8. In step S8, the CPU 19 calculates the current pixel usage.

The process then proceeds to step S9. In step S9, the CPU 19 determines whether or not the calculated pixel usage is equal to or lower than a set value that is additionally set as the "condition 1".

If the pixel usage is determined to be larger than the set value, that is, if the pixel usage is high to some extent, the CPU 19 terminates the projection state adjustment process. Thus, also in this case, projection of an image subjected to geometric correction based on the distortion correction process parameters determined in step S5 will be performed.

If the "condition 1" is determined not to be additionally set in step S7, or if the calculated pixel usage is determined to be equal to or lower than the set value in step S9, the process proceeds to step S10. In step S10, the CPU 19 determines again distortion correction process parameters under a permitted condition, that is, making the pixel usage higher than the set value by changing the aspect ratio. In this case, the CPU 19 changes the aspect ratio to maximize the pixel usage, but it is not desirable that the image subjected to distortion correction be too long in the horizontal direction or in the vertical direction. Thus, in such a case, the CPU 19 desirably determines again distortion correction process parameters so that the pixel usage is maximized within a predetermined range of the aspect ratio.

Subsequently, the process thus proceeds to step S11. In step S11, the CPU 19 determines whether or not the "condition 2" is additionally set as the read distortion correction mode. If the "condition 2" is determined not to be additionally set, the CPU 19 terminates the projection state adjustment process. As a result, subsequently, the image converter 13 will perform geometric correction on the basis of the distortion correction process parameters determined again in step S10 on input image data to project an image subjected to distortion correction.

If, on the other hand, the "condition 2" is determined to be set in step S11, the process proceeds to step S12. In step S12, the CPU 19 determines whether or not a change (Δaspect ratio) in the aspect ratio is within the range additionally set as the "condition 2".

If the Δaspect ratio is determined to be within the set range, the CPU 19 terminates the projection state adjustment process. As a result, subsequently, the image converter 13 will perform geometric correction on the basis of the distortion correction process parameters determined again in step S10 on input image data to project an image subjected to distortion correction.

If, on the other hand, the Δaspect ratio is determined not to be within the set range in step S12, the process proceeds to step S13. In step S13, the CPU 19 determines again (optimum) distortion correction process parameters under another condition (such as a condition that the change in the aspect ratio (Δaspect ratio) meets the condition 2). Specifically, the CPU 19 determines again distortion correction process parameters that make the pixel usage a little lower than that in step S10. The CPU 19 then terminates the projection state adjustment process. As a result, subsequently, the image converter 13 will perform geometric correction on the basis of the distortion correction process parameters determined again in step S13 on input image data to project an image subjected to distortion correction.

Figure 4:
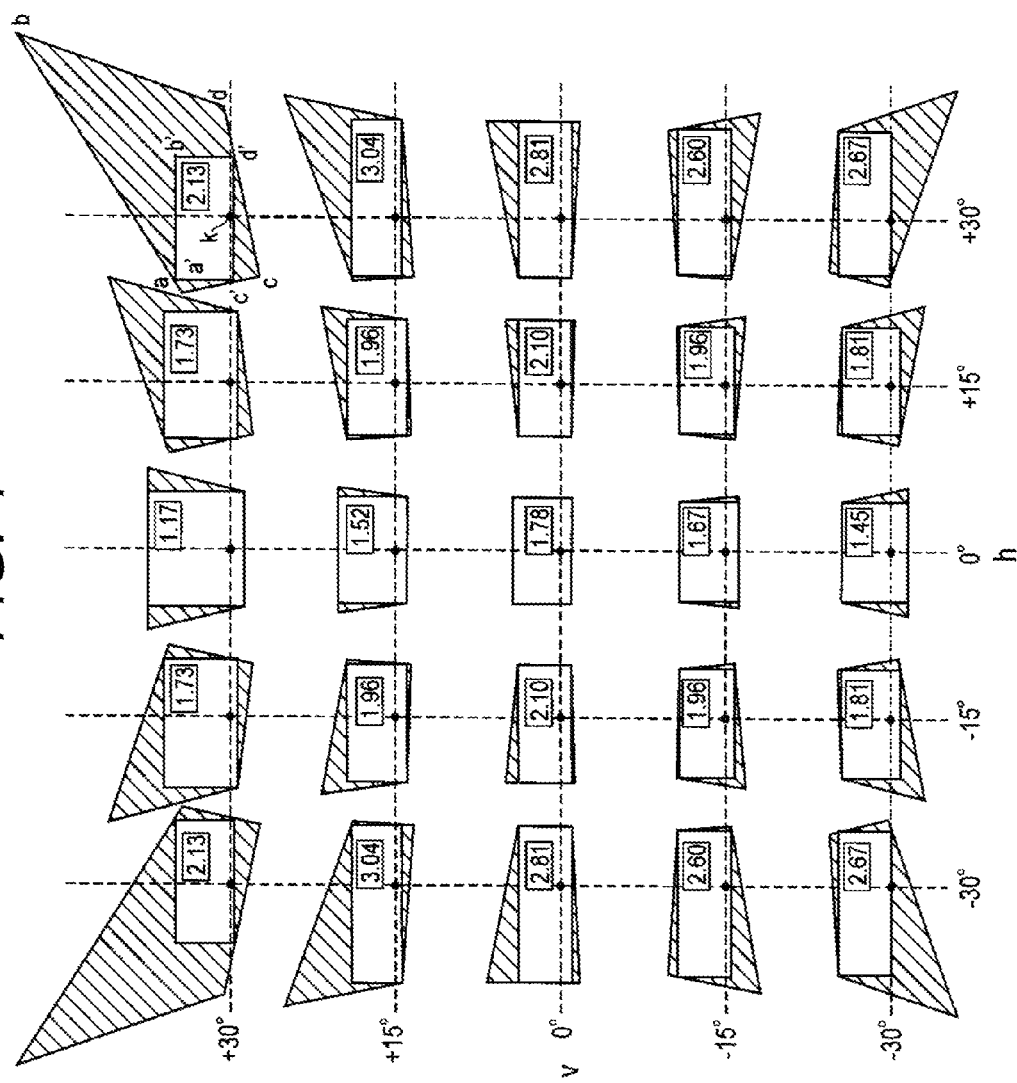
FIG. 4 is a diagram illustrating relations between an uncorrected distorted quadrangle and a corrected rectangle before and after distortion correction under a condition that the pixel usage is maximized when a change in the aspect ratio is permitted, as viewed on the projection plane according to the first embodiment.
Figure 5:
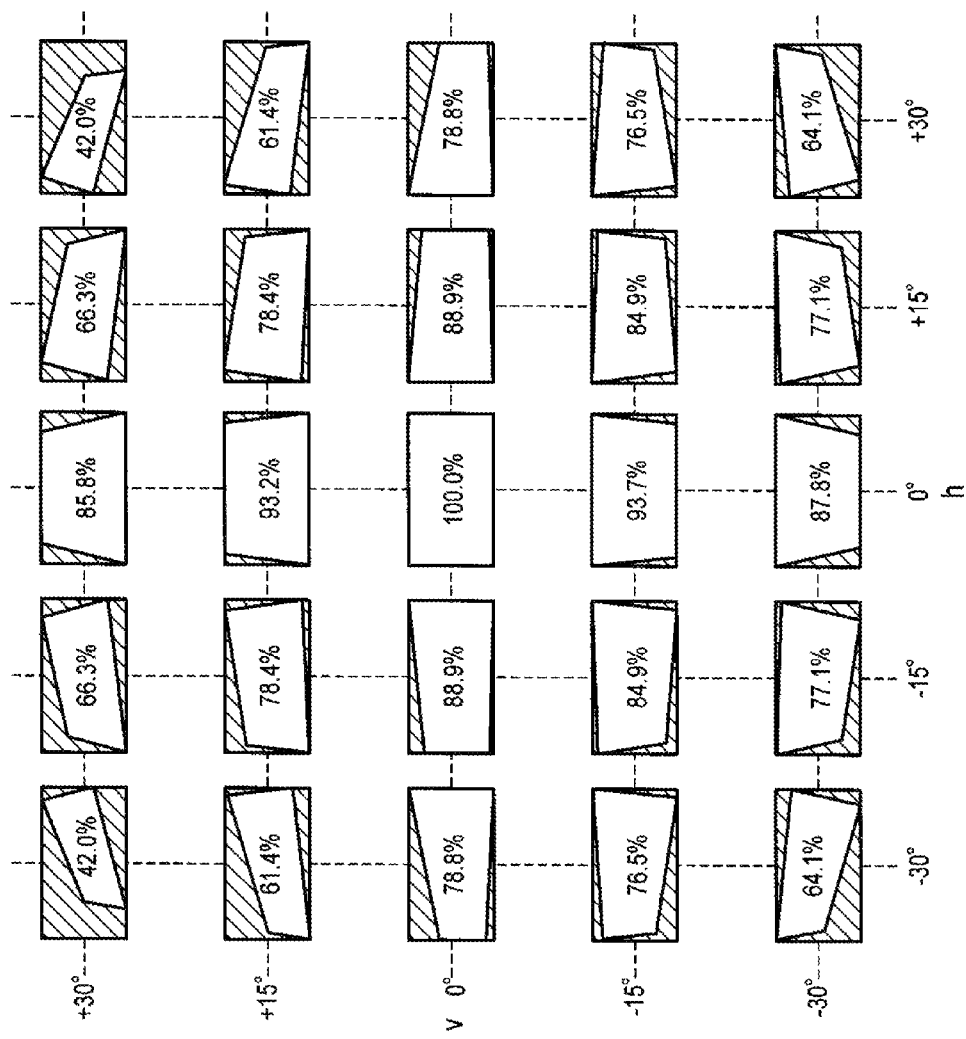
FIG. 5 is a diagram illustrating the relations in FIG. 4 as viewed on the surface of an output display device.

FIG. 4 is a diagram illustrating relations between the uncorrected distorted quadrangle abcd and the corrected rectangle a'b'c'd' before and after distortion correction under a condition that the pixel usage is maximized when a change in the aspect ratio is permitted, as viewed on the projection plane, and FIG. 5 is a diagram illustrating the same as viewed on the surface of an output display device. FIGS. 4 and 5 illustrate a case in which the aspect ratio and the cutting-out position of the corrected rectangle are determined so as to maximize the pixel usage with the same projector specification as that in FIGS. 16 and 17. Note that numerals in the corrected rectangles in FIG. 4 represent the aspect ratios (width÷height).

Comparison between FIGS. 4 and 16 (all the aspect ratios are 1.78) shows that the aspect ratio tends to be higher as the absolute value of the horizontal angle h is larger and that the aspect ratio tends to be lower as the absolute value of the vertical angle v is larger.

When neither of the horizontal angle h and the vertical angle v is zero, the effect of the horizontal angle h on the aspect ratio is greater than that of the vertical angle v. That is, the projected image is more likely to be horizontally long.

Figure 17:
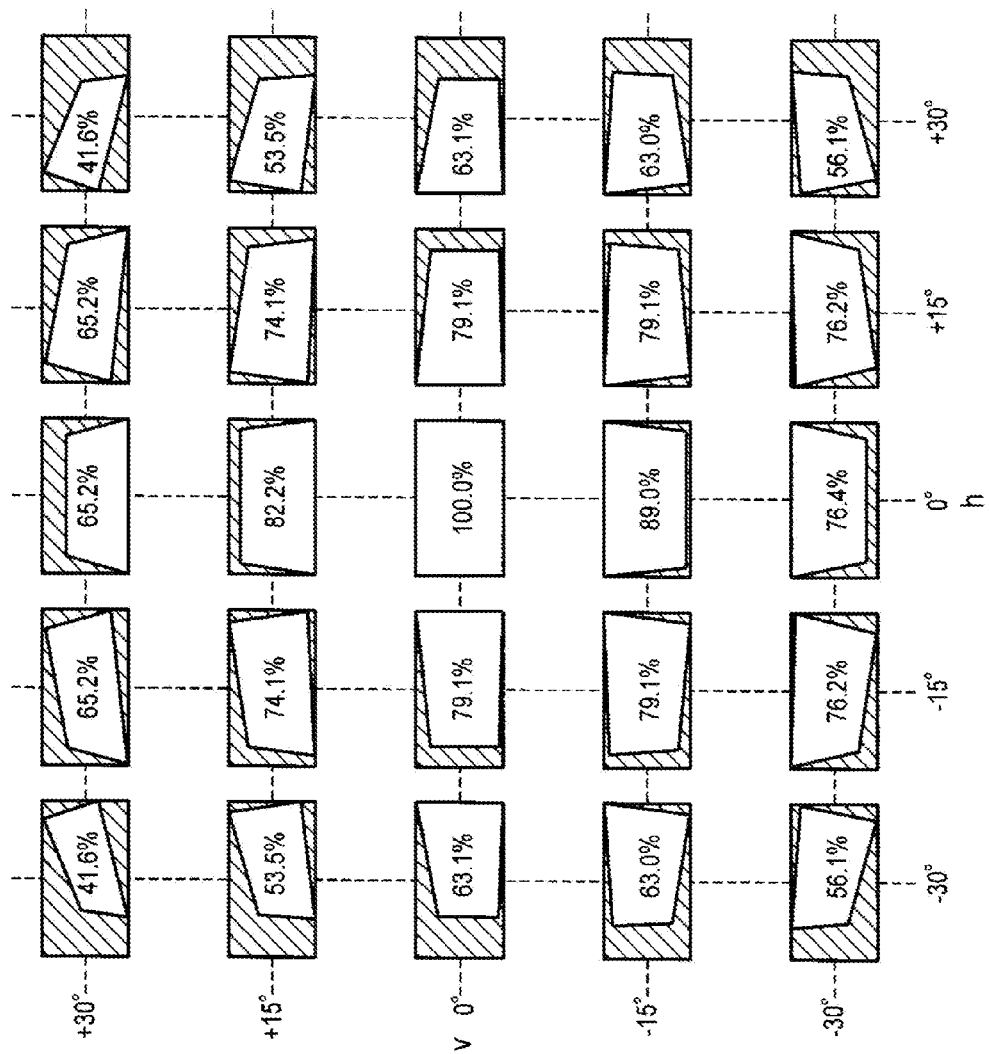
FIG. 17 is a diagram illustrating the relations between the uncorrected distorted quadrangle and the corrected rectangle before and after distortion correction of the projector as viewed on the surface of an output display device.

The respective pixel usages in FIG. 5 of the present embodiment are higher than those in FIG. 17. (The increases in pixel usage in the periphery (where h=v=30° or the like) are, however, slight (the pixel usage where h=v=30° is slightly increased from 41.6% in FIG. 17 to 42% in FIG. 5).) Thus, when the relative angles are h=v=−15°, for example, the pixel usage of 79.1% as in FIGS. 3 and 17 can be increased to 84.9% as in FIGS. 3 and 5 by permitting a change in the aspect ratio. In this example, the aspect ratio of 1.78 as shown in FIGS. 3 and 16 becomes 1.96 as shown in FIGS. 3 and 4, and the Δaspect ratio of +10.1% meets the "condition 2".

As described above, the projector 1 according to the present embodiment has a mode of performing the distortion correction while changing the aspect ratio of an input image, which can improve the flexibility in the distortion correction.

If it is determined in step S4 that the "maximum pixel usage" mode is not set, the process moves to another mode. If the "maximum projection size" mode is set, for example, such control as permitting a change in the aspect ratio to maximize the projection size can be made. This is effective when the projector 1 does not have a zoom function or the like. It is needless to say that the flexibility will also be increased by permitting a change in the aspect ratio when the "fixed diagonal intersection" mode is set.

Since the distortion correction process parameters obtained in the "maximum pixel usage" mode are the cut-out position of the corrected rectangle a'b'c'd' and the output number of pixels that improve the pixel usage of the output display device of the projector, projection with an improved pixel usage (with higher brightness and higher resolution) can be achieved.

In this case, since distortion correction process parameters are determined so that the aspect ratio is within a predetermined range to perform distortion correction, the corrected image can be prevented from being too long in the horizontal direction or the vertical direction.

Furthermore, since distortion correction process parameters are determined so that a change in the aspect ratio from the original aspect ratio of the input image is within a predetermined range to perform distortion correction, the aspect ratio of the corrected image can be prevented from being very different from the original aspect ratio.

Since a maintaining mode in which the original aspect ratio of the input image is maintained is further provided, the user can also conduct normal distortion correction that maintains the original aspect ratio.

Furthermore, since the user is informed of the effect of changing the aspect ratio or the user is informed of the degree of change when the aspect ratio is changed, the user can determine whether or not to permit a change in the aspect ratio taking the information into account.

Furthermore, since the distortion correction process parameters are determined on the basis of the relative angles with respect to the screen 2, appropriate distortion correction is performed depending on the installed state.

Moreover, since the angle-of-view information on the projector 1 is taken into account when the distortion correction process parameters are determined, a change in the angle of view in projection can also be addressed by adjusting a zoom lens of the projector lens 18.

Furthermore, since the relative angles with respect to the screen 2 are obtained on the basis of the detection result from the attitude sensor 23, appropriate relative angles can be readily obtained without measuring distances or the like.

Second Embodiment

A second embodiment will be described. In the second embodiment, differences from the first embodiment will be described, and parts that are the same as those in the first embodiment will be designated by the same reference numerals and the description thereof will not be repeated.

In the present embodiment, the roll angle can also be adjusted in distortion correction so as to further improve the pixel usage.

Figure 6:
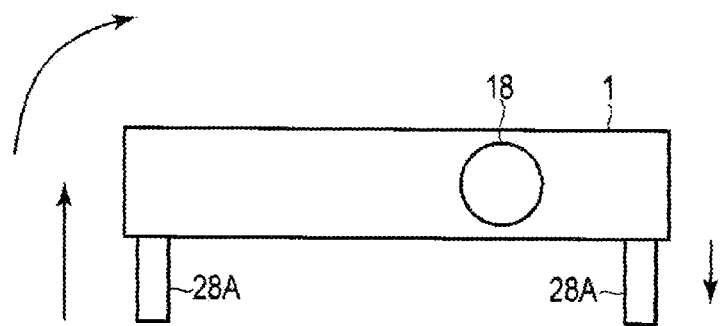
FIG. 6 is a diagram illustrating a structure of an electric leg part of a projector according to a second embodiment of the present invention.

The electric leg part 28 for supporting the housing of the projector 1 thus functions as an attitude and roll adjustment mechanism to change the attitude and the roll angle of the projector 1. Specifically, as illustrated in FIG. 6, the electric leg part 28 can adjust the levelness of the projector 1 by changing the length of each leg 28A independently, and/or adjust the roll angle without changing the optical axis direction (projecting direction) of the projector optical system, that is, by rotating the projector 1 about the optical axis.

The roll angle will be explained here.

Figure 7:
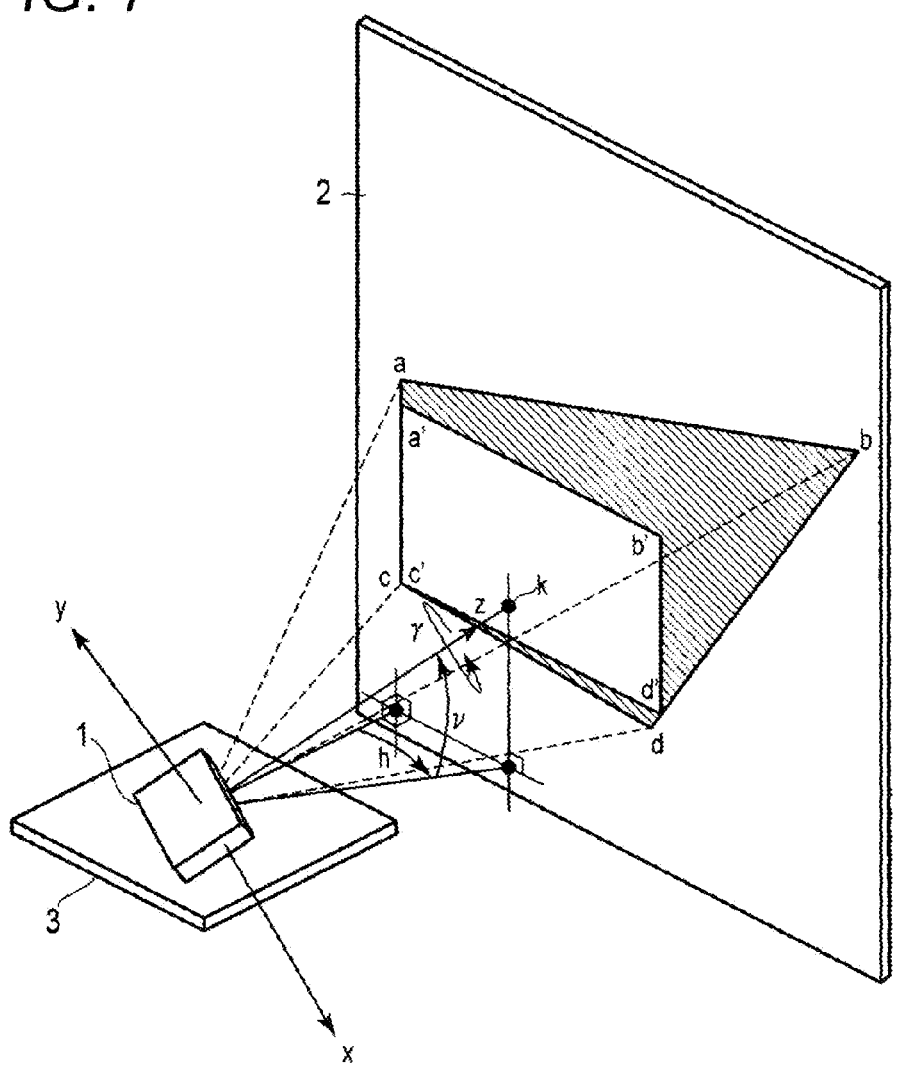
FIG. 7 is a diagram illustrating a state in which the projector is rotated about the z axis as the rotation axis by a roll angle r after the state in FIG. 14.
Figure 8A:
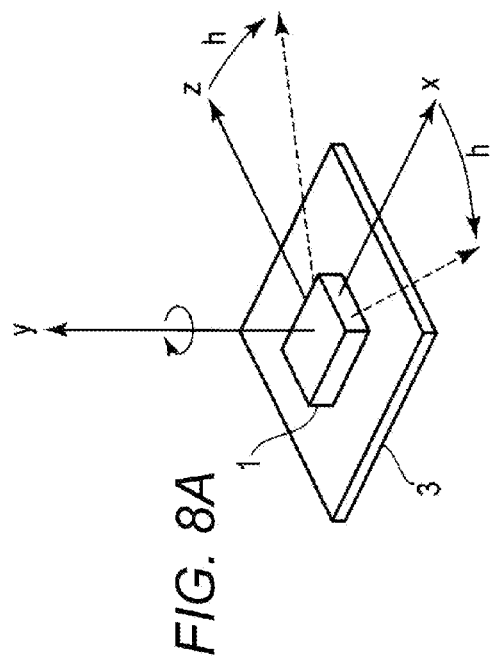
FIGS. 8A to 8D are detail views illustrating relations of a projector coordinate system and three angles h, v, and r in FIG. 7.
Figure 8B:
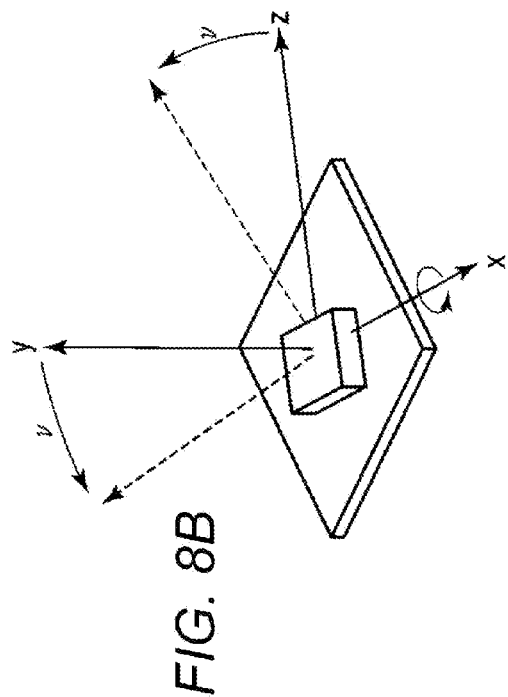
Figure 14:
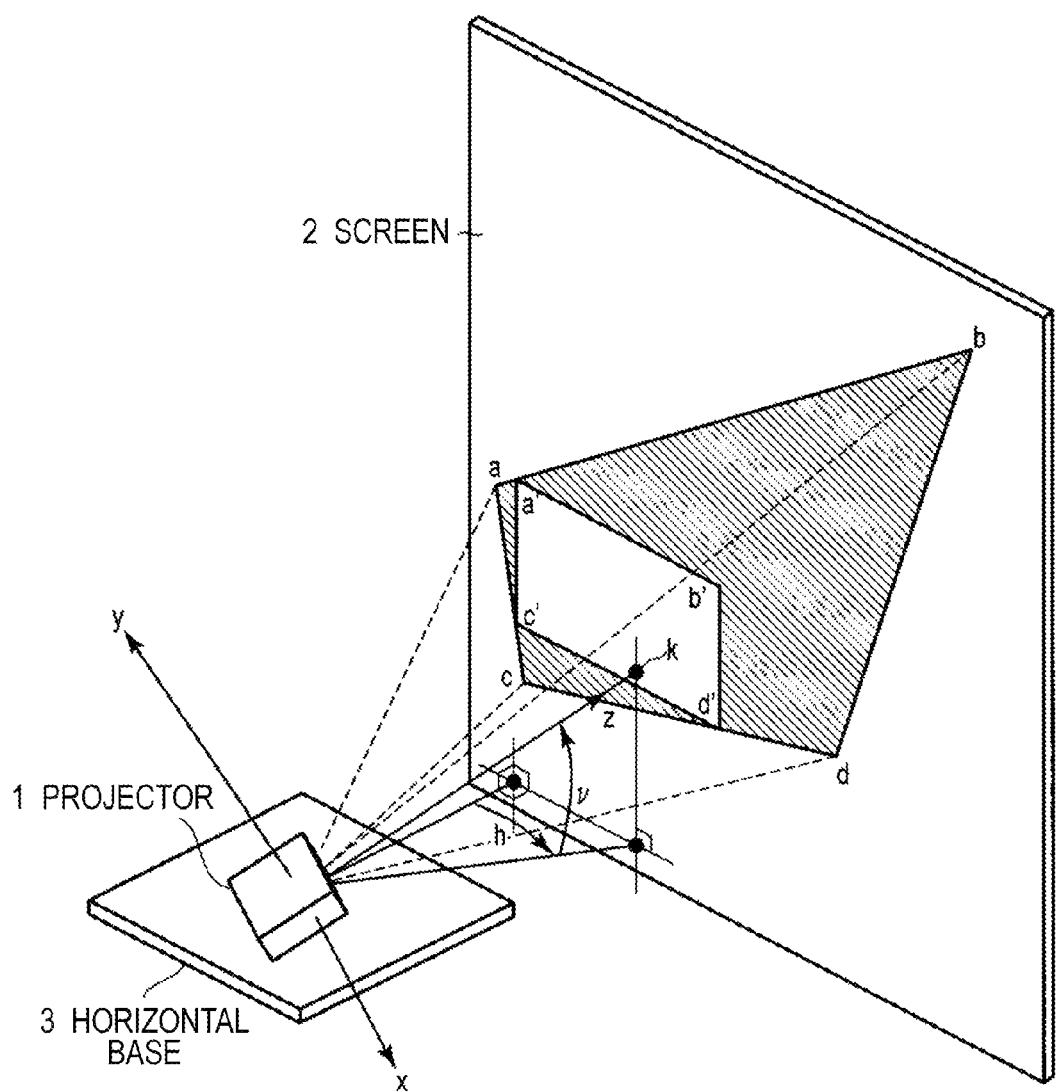
FIG. 14 is a perspective view illustrating the relation between a projector and a projection target (screen) where h=v=30°.
Figure 15A:
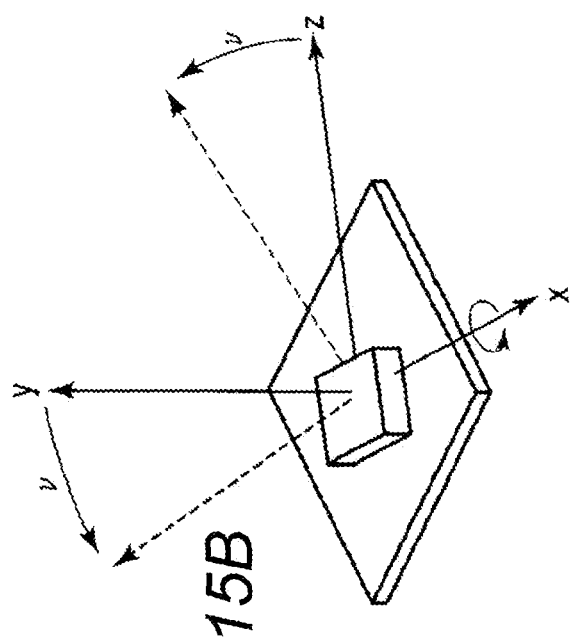
FIGS. 15A to 15C are detail views illustrating relations of a projector coordinate system and two angles h and v in FIG. 14.
Figure 15B:
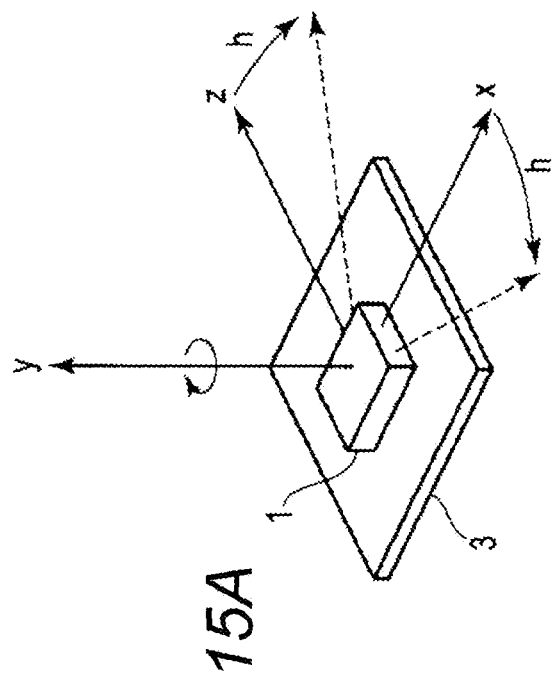
Figure 15C:
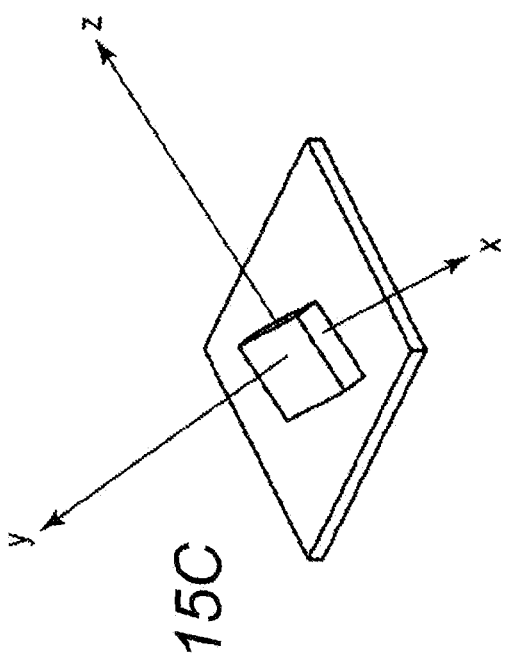

FIG. 7 illustrates a state in which the projector 1 is rotated about the z axis as the rotation axis by an angle r in the direction of the arrow after the state in FIG. 14. FIGS. 8A to 8D illustrate details thereof. Note that FIGS. 8A and 8B are the same as FIGS. 15A and 15B.

Figure 8C:
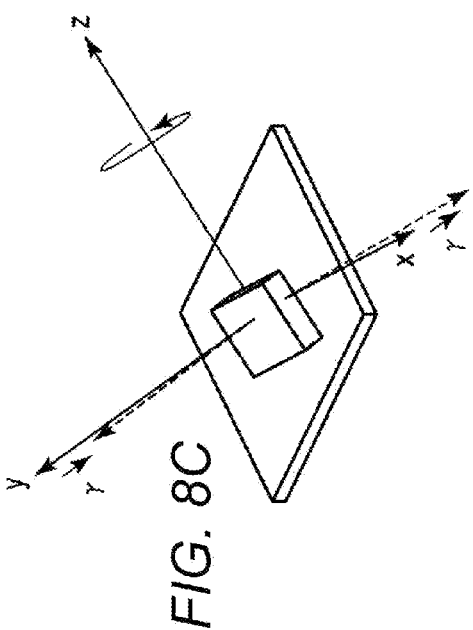

In FIG. 8C, the projector 1 is rotated about the z axis as the rotation axis in the direction of the arrow by the angle r that is a third angle. As a result, the x axis and the y axis moves to axes represented by dashed lines.

Figure 8D:
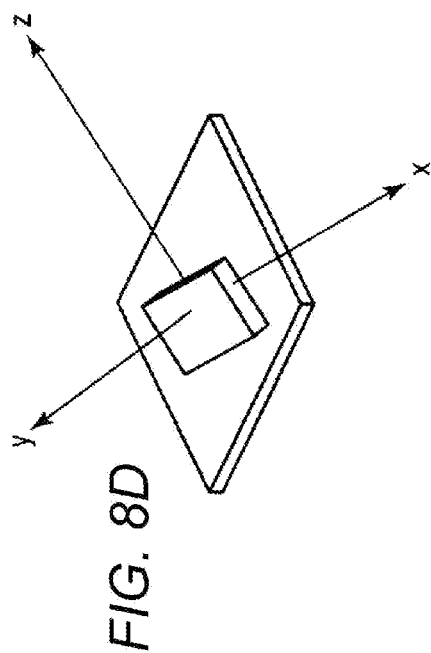

Three arrows in FIG. 8D represent the projector coordinate system after rotating the projector 1 first by the angle h in the horizontal direction, then by the angle v in the vertical direction, and further by the roll angle r. At this time, the x axis is no longer parallel to the horizontal base 3.

As a result of making the projector 1 roll in this manner, the shape of the uncorrected distorted quadrangle abcd projected on the screen 2 changes, and thus, the corrected rectangle a'b'c'd' cut out therefrom can also be changed.

The present embodiment focuses attention on this respect and attempts to increase the flexibility of distortion correction by positively causing a roll in contrast to a normal case in which distortion correction is performed after a roll is eliminated.

For example, when a roll is caused as in FIG. 7, the shape of the uncorrected distorted quadrangle abcd changes from that in a state in which no roll is caused as in FIG. 14. It is thus possible to increase the size, change the aspect ratio of the corrected rectangle a'b'c'd' cut out therefrom and improve the pixel usage.

The roll angle r that is the angle of the caused roll can be calculated in an unambiguous manner by combining the angles h and v in the horizontal and vertical directions of the projector 1 with respect to the screen 2. The roll angle r can be calculated by the following calculation formula (1), for example:

$$p = \arcsin(\sin h \cos v)$$
$$q = \arcsin\frac{\sin v}{\cos p} \quad (1)$$
$$r = \operatorname{sgn} hv \arccos\frac{\cos q}{\cos v}.$$

In the formula (1), sgn represents a signum function, which is expressed in detail by a formula (2) below. According to the signum function sgn, the roll angle r is zero when hv=0, that is, when either one or both of the horizontal angle h and the vertical angle v is zero, the roll angle r is positive when hv>0, that is, when the horizontal angle h and the vertical angle v have the same signs, or the roll angle r is negative when hv<0, that is, when the horizontal angle h and the vertical angle v have different signs.

$$\operatorname{sgn} x = \begin{cases} 1 : x > 0 \\ 0 : x = 0 \\ -1 : x < 0 \end{cases} \quad (2)$$

According to the formula (1), the roll angle r is determined to be approximately 16.1° when h=v=30°.

Figure 9:
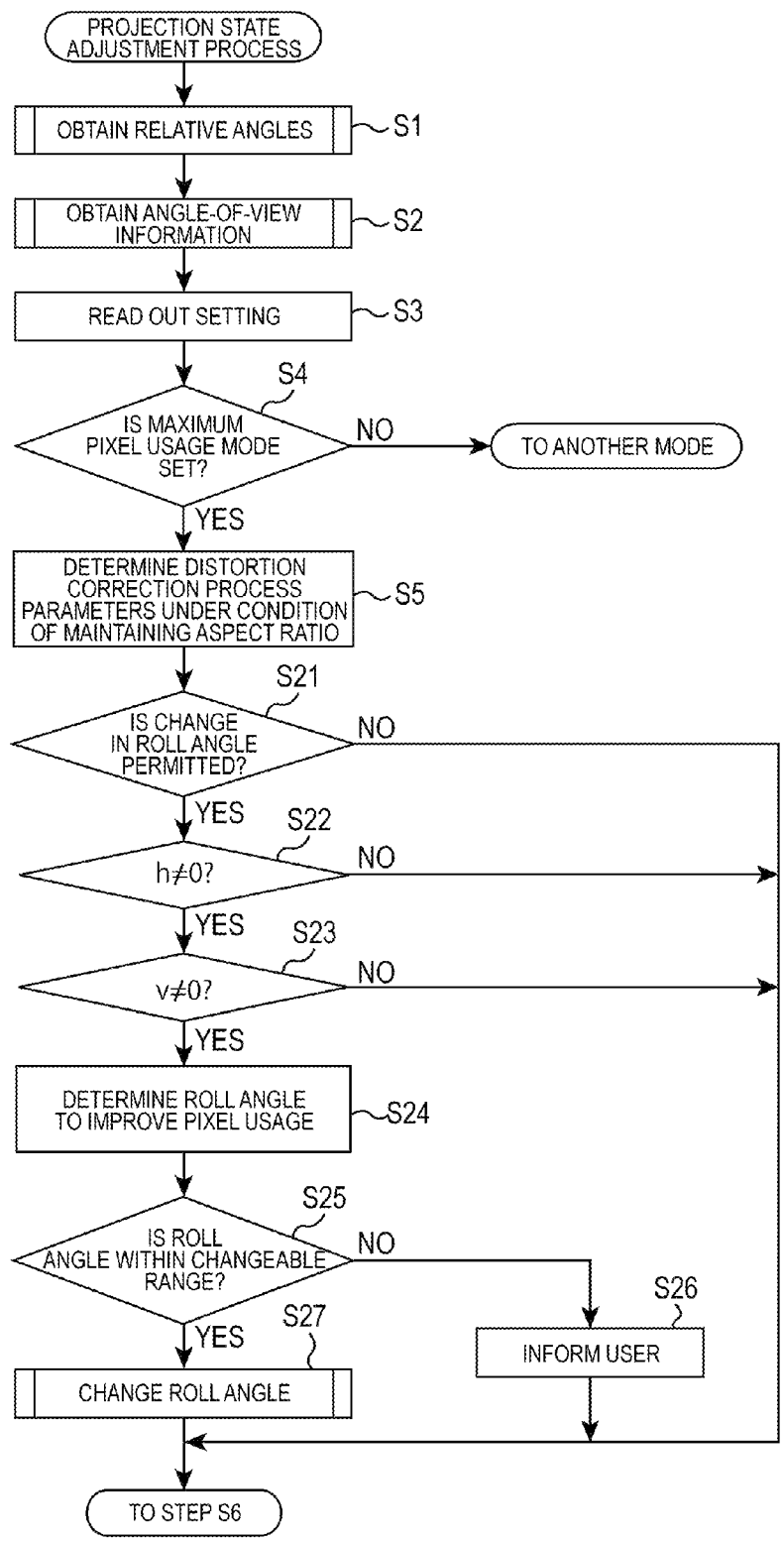
FIG. 9 is a flowchart illustrating an example of a projection state adjustment process of the projector according to the second embodiment.

Hereinafter, operation of the projector 1 according to the present embodiment will be described with reference to the flowchart of FIG. 9 illustrating an example of a projection state adjustment process according to the present embodiment.

Specifically, after the CPU 19 determines the shape of an uncorrected distorted quadrangle abcd on the basis of obtained relative angles and angle-of-view information and determines distortion correction process parameters by a cutting-out method that maximizes the pixel usage while maintaining the aspect ratio similarly to the first embodiment, the process proceeds to step S21 in the present embodiment.

In step S21, the CPU 19 determines whether or not a roll angle change mode is selected as an operation mode set by the user by using the operation unit 22.

Note that, in the present embodiment, the distortion correction mode setting menu screen 100 further includes a "roll setting" item allowing selection of either "not changing roll angle" or "permitting change in roll angle" as illustrated in FIG. 2.

In step S21, it is determine whether or not "permitting change in roll angle" is selected as the "roll setting".

If the "permitting change in roll angle" is determined not to be selected, the process proceeds to step S6 (FIG. 2) described above and the same operation as in the first embodiment is performed.

In contrast, if the "permitting change in roll angle" is determined to be selected in step S21, the process proceeds to step S22. In step S22, the CPU 19 determines whether or not the angle h in the horizontal direction of the relative angles obtained in step S1 is zero.

If the angle h in the horizontal direction is determined to be zero, the process proceeds to step S6, where the same operation as in the first embodiment is performed.

In contrast, if the angle h in the horizontal direction is determined not to be zero in step S22, the process proceeds to step S23. In step S23, the CPU 19 determines whether or not the angle v in the vertical direction of the relative angles obtained in step S1 is zero.

If the angle v in the vertical direction is determined to be zero, the process proceeds to step S6, where the same operation as in the first embodiment is performed.

If the angle v in the vertical direction is determined not to be zero in step S23, that is, if both of the angles h and v in the horizontal and vertical directions are determined not to be zero, the process proceeds to step S24.

In step S24, the CPU 19 determines a roll angle r that improves the pixel usage by using the formula (1) described above, for example. Thereafter, in step S25, the CPU 19 determines whether or not the determined roll angle r is within such a range that can be changed by the electric leg part 28.

If the roll angle r is determined not to be within the changeable range, the process proceeds to step S26. In step S26, the CPU 19 informs the user that the roll angle cannot be changed. The CPU 19 informs the user by controlling the audio processor 24 to emit an alarm through the speaker 25, or by controlling the image converter 13 to generate image data on which a warning symbol is superimposed as an OSD and project the image data onto the screen 2, for example.

The process then proceeds to step S6, where the same operation as in the first embodiment is performed.

If, on the other hand, the roll angle r is determined to be within the changeable range in step S25, the process proceeds to step S27. In step S27, the CPU 19 makes the attitude adjustment unit 27 drive the electric leg part 28 to change the roll angle of the projector 1 according to the roll angle r determined in step S24.

Thereafter, the process proceeds to step S6, where the same operation as in the first embodiment is performed.

Note that, as illustrated in FIG. 3, the distortion correction mode setting menu screen 100 is provided with an area for displaying a changed angle under the "permitting change in roll angle" item so as to inform the user of the degree to which the roll angle is to be changed (or is changed). This allows the user to recognize the changed angle together with the effect of changing the aspect ratio as described in the first embodiment after the projection state adjustment process is terminated and before the actual image projection is started or when the distortion correction mode setting menu screen 100 is projected again.

Figure 10:
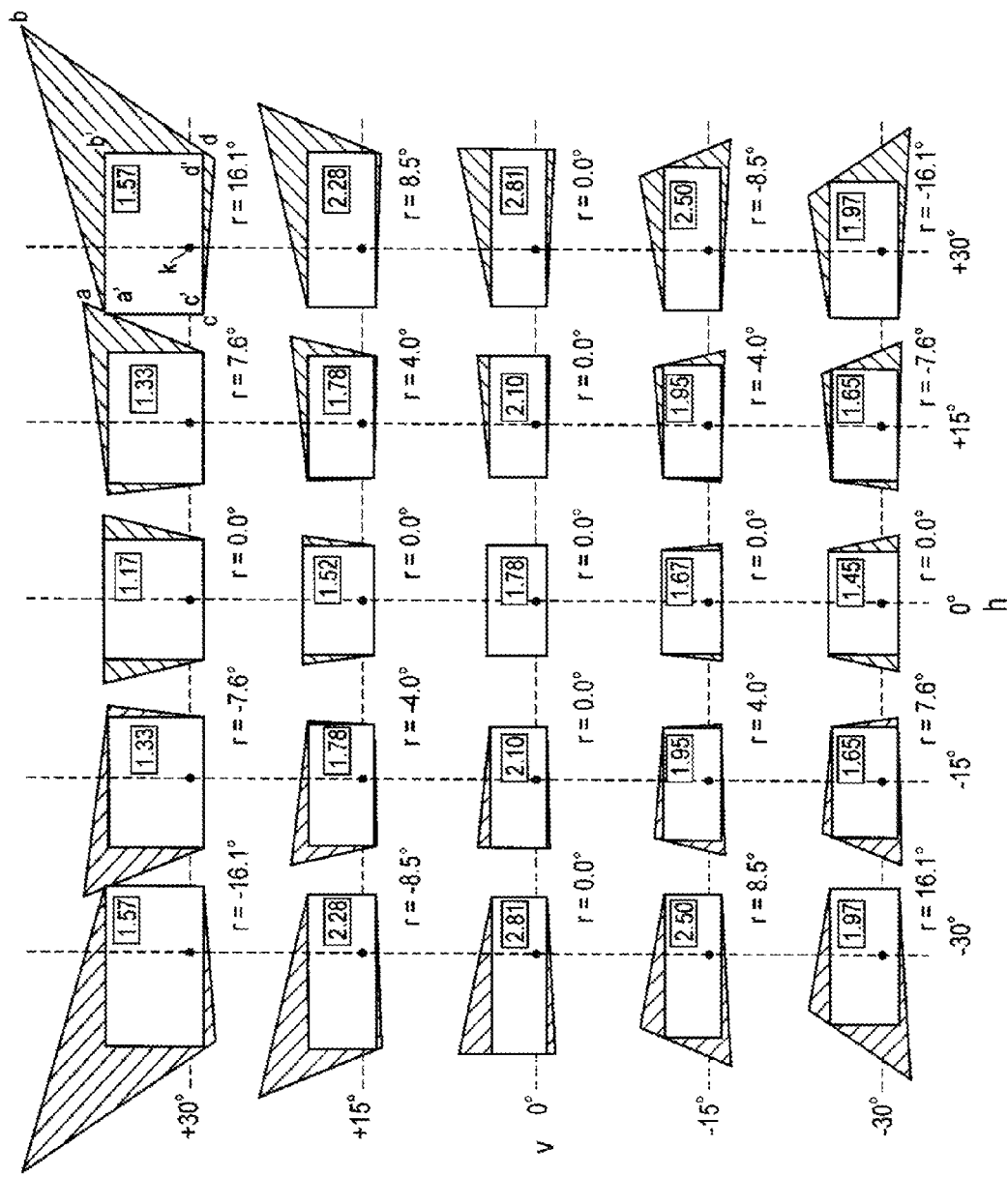
FIG. 10 is a diagram illustrating relations between an uncorrected distorted quadrangle and a corrected rectangle before and after distortion correction under a condition that the pixel usage is maximized when a change in the aspect ratio is permitted and the roll angle is positively changed, as viewed on the projection plane according to the second embodiment.
Figure 11:
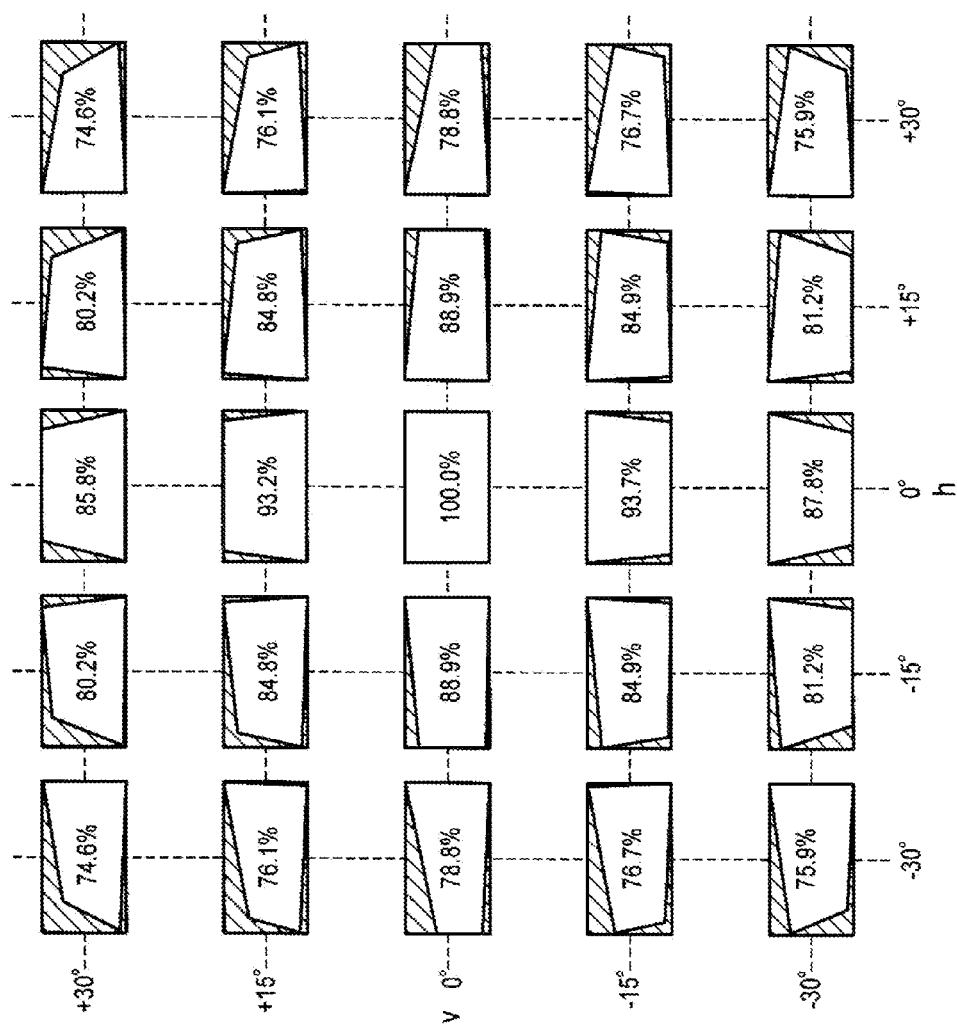
FIG. 11 is a diagram illustrating the relations in FIG. 10 as viewed on the surface of an output display device.

FIG. 10 is a diagram illustrating relations between the uncorrected distorted quadrangle abcd and the corrected rectangle a'b'c'd' before and after distortion correction under a condition that maximizes the pixel usage when a change in the aspect ratio is permitted and the roll angle is positively changed, as viewed on the projection plane, and FIG. 11 is a diagram illustrating the same as viewed on the surface of an output display device. FIGS. 10 and 11 illustrate cases in which the projector specification is the same as that in FIGS. 16 and 17 and in which the aspect ratio and the cut-out position of the corrected rectangle is determined so that the pixel usage is maximum, for example. Note that the numerals in the corrected rectangles in FIG. 10 represent the aspect ratios (width÷height) and values of r in FIG. 10 are the respective roll angles r.

As a result of positively changing the roll angle as in the present embodiment, comparison between FIGS. 10 and 11 and FIGS. 4 and 5, respectively, shows that the change in the aspect ratio is smooth, the projected image is less likely to be horizontally long than in the first embodiment, and pixel usage of the corresponding part is greatly improved when neither of the horizontal angle h and the vertical angle v is zero. For example, the pixel usage where h=v=30° is greatly improved from 42.5% in FIG. 5 of the first embodiment to 74.6% in FIG. 11 of the present embodiment.

Furthermore, in the first embodiment, when the relative angles are h=v=30°, the aspect ratio becomes 2.67 as shown in FIG. 4 where the Δaspect ratio is +50% from the original aspect ratio 1.78, which does not meet the "condition 2", that is, the projected image becomes too long in the horizontal direction. Thus, the pixel usage is not very high.

In contrast, in the second embodiment, since the aspect ratio becomes 1.97 as shown in FIG. 10, the Δaspect ratio is +10.6%, which meets the "condition 2" and can greatly improve the pixel usage from 56.1% in FIG. 17 to 75.9% in FIG. 11 that is higher than 64.1% in FIG. 4 of the first embodiment.

When the relative angles are h=v=+15°, for example, the pixel usage can be improved to 84.8% in FIG. 11 in the second embodiment as compared to 78.4% in FIG. 5 in the first embodiment.

In addition, the original aspect ratio of 1.78 can be maintained at 1.78 in FIG. 10 in the second embodiment as compared to 1.96 in FIG. 4 in the first embodiment, which can increase the reproducibility of the original image.

As described above, according to the second embodiment, since the roll angle of a projected image is positively changed and the distortion correction is performed so that the projected image becomes a rectangular image on the screen 2 taking (reflecting) the changed roll angle into account, the flexibility in the distortion correction can further be improved than the first embodiment.

Furthermore, according to the second embodiment, projection with a further increased pixel usage (with higher brightness and higher resolution) that in the first embodiment.

According to the second embodiment, the change in the aspect ratio can also be made smaller.

Modified Example

While the roll angle is changed by using the electric leg part 28 in the second embodiment, the roll angle changing mechanism is not limited thereto.

Figures 12, 13:
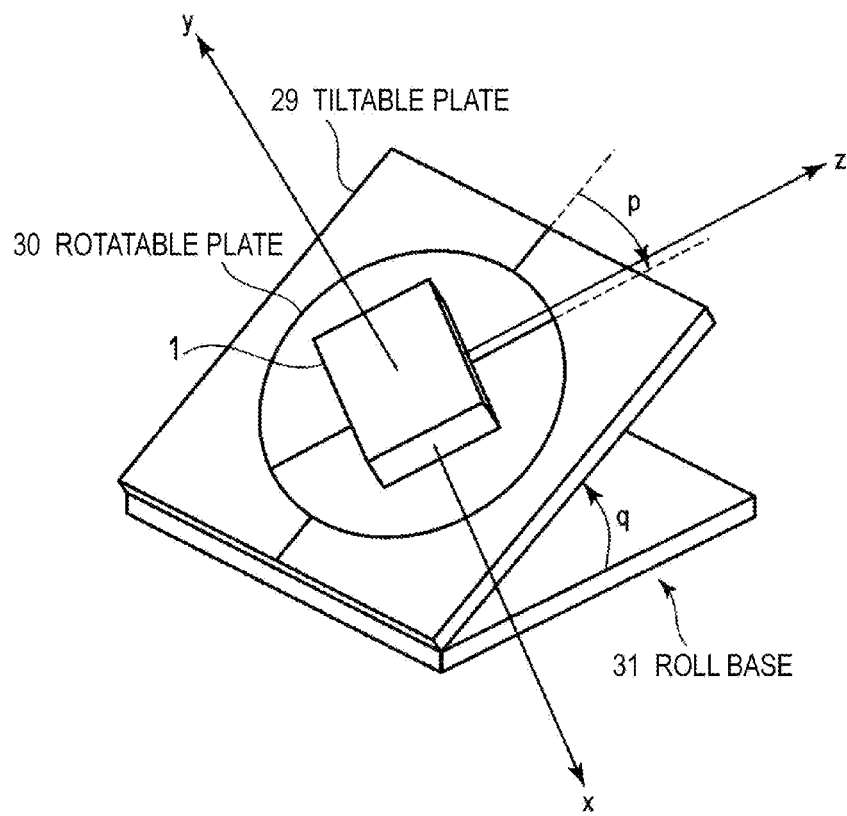
FIG. 12 is a diagram illustrating an example of a roll angle changing mechanism according to the second embodiment of the present invention.
FIG. 13 is an example of an optimum roll angle look-up table.

For example, as illustrated in FIG. 12, it may be considered to use a roll base 31 including a tiltable plate 29 and a rotatable plate 30. Specifically, the projector 1 is placed on the rotatable plate 30 provided on the tiltable plate 29. In FIG. 12, p represents an angle of rotation (the angle in the yaw direction) of the rotatable plate 30, and q represents an angle of inclination (the angle in the pitch direction) of the tiltable plate 29. These p and q correspond to p and q, respectively, in the formula (1). In this case, the roll angle can be automatically applied, and control and drive for changing the roll angle are thus unnecessary. Note that, in FIG. 12, the screen is placed in a manner that the z axis of the projector coordinate system is perpendicular to the screen when p=q=0.

Thus, the projector coordinate system in FIG. 12 is equivalent to that in FIG. 8D which is a projector coordinate system after first changing the horizontal angle, then changing the vertical angle, and finally changing the roll angle. Specifically, the directions of three axes of the projector coordinate system when p≈25.7° and q≈33.7° in FIG. 14 are the same as those of three axes of the projector coordinate system, respectively, when h=v=30° and r≈16.1° in FIG. 14.

Thus, according to the present modified example, p and q can be directly detected by a sensor or the like and the distortion correction process parameters can be easily determined.

Furthermore, the roll angle can be changed without changing the design of the projector 1.

Needless to say, the structure of the roll base 31 is not limited to that illustrated in FIG. 12.

While the present invention has been described by way of certain embodiments, the present invention is not limited to the embodiments described above but can be embodied with components modified without departing from the scope of the invention in carrying out the invention.

For example, the roll angle changing mechanism can employ various techniques such as a rotation mechanism configured to electrically rotate the output display device in the projector about the optical axis instead of changing the attitude of the entire projector 1. As a result of changing the roll angle of a projected image by using the rotation mechanism configured to rotate the output display device about the optical axis, the roll angle can be changed inside of the housing of the projector 1. Note that, with the configuration of the rotation mechanism or the like mentioned above, it is possible to keep the optical axis position unchanged in changing the roll angle.

Furthermore, it is also desirable to keep the optical axis position unchanged when the roll angle is changed with the configuration as illustrated in FIG. 6 or in FIG. 12.

In changing the roll angle with such a configuration as in FIG. 6, when one of the left and right legs is extended, for example, the optical axis position can be kept unchanged by making the other leg retract appropriately on the basis of the optical axis position in the lateral direction.

It is, however, not essential to keep the optical axis position unchanged in changing the roll angle.

A configuration in which such roll angle changing mechanisms can be combined may be used.

Furthermore, when the electric leg part 28 and the roll base 31 are used as roll angle changing mechanisms, the user may be informed of the roll angle to be changed and allowed to change the states of the roll angle changing mechanisms instead of changing the states by control by the CPU 19. In this case, if the user is informed of the current roll angle detected by the attitude sensor 23, the use can support to tilt the projector 1 at an appropriate roll angle. In such a case, it is still effective to inform only of the direction (such as "tilt the projector leftward (by about five degrees)", for example).

As a result of determining an appropriate roll angle and informing the user of the direction of the appropriate roll angle, the user can tilt the housing appropriately according to the information. Furthermore, as a result of informing the user of (the value of) an appropriate roll angle in addition to the direction thereof, the user can see the value to adjust the angle to the informed angle.

Furthermore, regarding the method for obtaining the relative angles between the projector 1 and the screen 2, the relative angles can be obtained by a known multipoint ranging technique, that is, by measuring the distances to multiple points (three or more points that are not on one straight line) on the screen 2 without using the attitude sensor 23. The method for measuring the distances may be any known technique such as one using ultrasound waves, infrared rays, or laser light. As a result of obtaining the relative angles with respect to the screen 2 on the basis of a result of measurement by a distance measuring means (unit), the relative angles can be appropriately obtained.

Alternatively, various techniques can be employed as another method for obtaining the relative angles, such as a method of projecting a test chart and obtaining the relative angles on the basis of image data obtained by capturing the test chart or a method of measuring the relative angles and inputting the measurement result through the operation unit 22 by the user.

Furthermore, the formula (1) (and the formula (2)) is not a formula for obtaining an optimum roll angle but a formula for easily obtaining a better solution. It is needless to say that the present invention can use other calculation formulae.

For obtaining an optimum roll angle, such an optimum roll angle can be obtained for each set of relative angles with respect to the screen 2 in advance or by a sequential/round-robin method (for example, a method of searching for an angle at which the pixel usage is maximum at 0.5-degree intervals within a controllable range). As a result of searching for the roll angle to change to, determining and changing the roll angle in this manner, the optimum roll angle can be determined.

Furthermore, such values found in advance may be stored in a form of a look-up table as illustrated in FIG. 13, for example, in the program memory 21, so that the roll angle can be determined by referring to the look-up table. As a result of storing a roll angle to change to for each set of relative angles, determining the roll angle to change to by referring to the stored information, and changing the roll angle in this manner, an optimum roll angle can be readily determined.

While the "condition 1" and the "condition 2" can be set in the aspect ratio changing correction mode, the conditions are merely examples and other conditions may be set. Furthermore, instead of setting conditions, the pixel usage after changing the aspect ratio may be calculated, the user may be informed that "the pixel usage can be improved up to X %", for example, and the user may be allowed to determine whether or not permit the change in the aspect ratio taking the information into account. Furthermore, the information may include information on the aspect ratio in this case.

Furthermore, in the aspect ratio changing correction mode, multiple aspect ratios to which the aspect ratio can be changed may be determined and presented to the user, and the user may be allowed to select any of the aspect ratios. As a result of presenting the aspect ratios to which the aspect ratio can be changed and allowing selection therefrom, a user-friendly projector can be provided.

Furthermore, while the distortion correction mode setting menu screen 100 is described to be projected and displayed on the screen 2, it is needless to say that the projector 1 may be provided with a display unit on which the distortion correction mode setting menu screen 100 is displayed.

Furthermore, various aspects of the invention can be achieved by appropriately combining components disclosed in the embodiments.

For example, if the problems mentioned above can be solved and the advantageous effects of the invention can be produced without some of the features presented in the embodiments, a configuration without the features can be extracted as an invention.

Furthermore, components of different embodiments may be combined where appropriate.

What is claimed is:

1. A projection apparatus to which an image is input for projection onto a projection target, the projection apparatus comprising:
a processor configured to perform control to correct an image to be projected onto the projection target to be a rectangular image,
wherein the processor has a correction mode in which an aspect ratio of the input image is changed based on pixel usage, and
wherein when the correction mode is set, the processor determines a pixel usage of the input image when corrected to be rectangular while maintaining the aspect ratio of the input image, and, when the pixel usage is less than or equal to a predetermined threshold, the processor changes the aspect ratio of the input image by an amount that is equal to or less than a preset change rate.

2. The projection apparatus according to claim 1, wherein the processor performs control to correct distortion to improve a pixel usage of an output display device of the projection apparatus.

3. The projection apparatus according to claim 1, wherein the processor performs control to correct distortion so that the aspect ratio is within a predetermined range.

4. The projection apparatus according to claim 1, wherein the processor further has a maintaining mode in which an original aspect ratio of the input image is maintained.

5. The projection apparatus according to claim 1, further comprising a roll angle changing mechanism, wherein the processor controls the roll angle changing mechanism to change a roll angle to turn a projected image, and the processor performs control to correct distortion taking the changed roll angle into account.

6. The projection apparatus according to claim 5, wherein the processor is configured to inform of a direction of the roll angle changed by the roll angle changing mechanism.

7. The projection apparatus according to claim 6, wherein the processor further informs of the roll angle.

8. The projection apparatus according to claim 1, further comprising:
an output device which is controlled by the processor to present multiple aspect ratios to which the aspect ratio can be changed; and
an input device configured to receive a user's selection of one of the multiple presented aspect ratios.

9. The projection apparatus according to claim 1, wherein the processor is configured to inform a user of an effect of changing the aspect ratio.

10. The projection apparatus according to claim 1, wherein the processor is configured to inform a user of a degree of change when the aspect ratio is changed.

11. The projection apparatus according to claim 1, wherein the processor is configured to obtain a relative angle between the projection apparatus and the projection target, and wherein the processor performs control to correct distortion based on the obtained relative angle.

12. The projection apparatus according to claim 11, further comprising a distance measuring sensor configured to measure distances to multiple points on the projection target, wherein the processor obtains the relative angle based on a result of measurement by the distance measuring sensor.

13. The projection apparatus according to claim 11, further comprising an attitude detecting sensor configured to detect an attitude of the projection apparatus, wherein the processor obtains the relative angle based on a result of detection by the attitude detecting sensor.

14. A projection method for a projection apparatus to which an image is input for projection onto a projection target, the projection method comprising:
   determining whether or not a correction mode in which an aspect ratio of the input image is changed based on pixel usage to correct distortion is set; and
   correcting distortion of an image to be projected onto the projection target to be a rectangular image;
   wherein correcting the distortion of the image to be a rectangular image comprises, when the correction mode is set, processor determining a pixel usage of the input image when corrected to be rectangular while maintaining the aspect ratio of the input image, and, when the pixel usage is less than or equal to a predetermined threshold, the changing the aspect ratio of the input image by an amount that is equal to or less than a preset change rate.

15. A non-transitory computer readable recording medium having a program causing a computer in a projection apparatus to which an image is input for projection onto a projection target to execute functions comprising:
   determining whether or not a correction mode in which an aspect ratio of the input image is changed based on pixel usage to correct distortion is set; and
   correcting an image to be projected onto the projection target to be a rectangular image,
   wherein correcting the distortion of the image to be a rectangular image comprises, when the correction mode is set, processor determining a pixel usage of the input image when corrected to be rectangular while maintaining the aspect ratio of the input image, and, when the pixel usage is less than or equal to a predetermined threshold, the changing the aspect ratio of the input image by an amount that is equal to or less than a preset change rate.

* * * * *